United States Patent
Pathak et al.

(10) Patent No.: US 11,392,415 B2
(45) Date of Patent: Jul. 19, 2022

(54) ELECTRONIC DEVICES AND METHODS FOR 5G AND B5G MULTI-CORE LOAD BALANCING

(71) Applicant: Samsung Electronics Co., Ltd., Suwon-si (KR)

(72) Inventors: Lalit Pathak, Bangalore (IN); Tushar Vrind, Bangalore (IN); Samir Kumar Mishra, Bangalore (IN); Diwakar Sharma, Bangalore (IN); Raju Udava, Bangalore (IN); Nikhil Patni, Bangalore (IN); Debasish Das, Bangalore (IN); Rohit Kumar, Bangalore (IN); Lakshmi Prasanna Jasti, Bangalore (IN); Manan Dixit, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 132 days.

(21) Appl. No.: 16/549,289

(22) Filed: Aug. 23, 2019

(65) Prior Publication Data
US 2020/0065147 A1 Feb. 27, 2020

(30) Foreign Application Priority Data
Aug. 24, 2018 (IN) .............................. 201841031838

(51) Int. Cl.
*G06F 9/46* (2006.01)
*G06F 9/50* (2006.01)
*G06F 9/48* (2006.01)

(52) U.S. Cl.
CPC ............ *G06F 9/505* (2013.01); *G06F 9/4881* (2013.01); *G06F 9/5094* (2013.01); *G06F 2209/483* (2013.01)

(58) Field of Classification Search
CPC ...... G06F 9/505; G06F 9/4881; G06F 9/5094; G06F 2209/483
See application file for complete search history.

(56) References Cited

U.S. PATENT DOCUMENTS

2009/0083390 A1 * 3/2009 Abu-Ghazaleh ........ H04L 41/12
709/209
2009/0150898 A1 6/2009 Sohn et al.
(Continued)

FOREIGN PATENT DOCUMENTS

CN 105446816 A 3/2016

OTHER PUBLICATIONS

D. Tudor et al., "Towards a Load Balancer Architecture tor Multi-Core Mobile Communication Systems," May 2009.
(Continued)

*Primary Examiner* — Wissam Rashid
(74) *Attorney, Agent, or Firm* — Harness, Dickey & Pierce, PLC

(57) ABSTRACT

A method for load balancing in a multi-core processor of an electronic device, the method including dividing, by the electronic device, a first task and at least one second task into a plurality of task-jobs, determining, by the electronic device, at least one core configuration for each of the plurality of task-jobs, scheduling, by the electronic device, each of the plurality of task-jobs on at least one core of the multi-core processor based on the at least one core configuration to generate an execution schedule, and executing, by the multi-core processor, the plurality of task-jobs according to the execution schedule.

20 Claims, 8 Drawing Sheets

(56) References Cited

U.S. PATENT DOCUMENTS

2011/0078652 A1* 3/2011 Mani .................. G06F 8/10
717/105
2020/0183741 A1* 6/2020 Tang .................. G06F 9/3887

OTHER PUBLICATIONS

Anas Showk et al., "Balancing LTE Protocol Load on a Multi-Core Hardware Platform Using EFSM Migration," 2011, The Sixth International Multi-Conference on Computing in the Global Information Technology, pp. 76-83.

A. Showk et al., "An Energy Efficient Multi-Core Modem Architecture for LTE Mobile Terminals," 2012.

* cited by examiner

ELECTRONIC DEVICES AND METHODS FOR 5G AND B5G MULTI-CORE LOAD BALANCING

CROSS-REFERENCE TO RELATED APPLICATIONS

This application claims priority under 35 U.S.C. § 119 to Indian Provisional Patent Application No. 201841031838 filed on Aug. 24, 2018, in the Indian Intellectual Property Office, the disclosure of which is incorporated by reference herein in its entirety.

BACKGROUND

The present disclosure relates to load balancing in a multi-core environment and more specifically to a method and electronic device for energy aware real time load balancer for 5G ($5^{th}$ Generation) and B5G (Beyond $5^{th}$ Generation) multi-core user equipment.

The third generation partnership project (3GPP) has developed a new generation of radio technology called $5^{th}$ Generation New Radio (5G NR) to provide enhanced Mobile Broadband (eMBB) having higher throughput and Ultra-Reliable Low Latency Communications (URLLC). Incorporation of multi-core architectures into User Equipment (UE) has been considered as a suitable solution to provide for increased computations associated with 5G NR. For example, the multi-core architectures may include a multi-core processor (MP) architecture (e.g., Symmetric Multi-Processing (SMP) or Asymmetric Multi-Processing (AMP)).

Supporting multi-core architectures involves challenges like software partitioning and data synchronization for maximizing or improving multi-core utilization. Real-time Operating Systems (RTOS) are used with multi-core architectures by enabling programmers to control the binding of tasks to specific cores, or by letting the RTOS control the binding of tasks to specific cores (e.g., by executing software instructions). In contrast to the widespread adoption of multi-core architectures, there has been little improvement regarding automated software partitioning and data synchronization techniques while moving from a single core architecture to a multi-core architecture.

Although compile-time techniques like Open Multi-Processing (OpenMP) which allow the programmer to write code tailored for a multi-core architecture are available, such compile-time techniques are heavily platform reliant. In order to realize high performance in a multi-core processor, every core should be utilized to its maximum efficiency or a high efficiency. This may be achieved by using a load balancer (LB) for allotting tasks evenly across cores. The load balancer performs task allocation either statically by offline analysis of the workload or in real time by online analysis of the workload.

The architecture for a Multi-core Processor system 100 is shown in FIG. 1. The Multi-core Processor system 100 includes N number of cores 102 (e.g., core 1, core 2 . . . core N) and executes a RTOS. The RTOS is configured to schedule various tasks 108 (e.g., task 1, task 2 . . . task M). Each task has three main properties: task priority, core affinity and resources availability/allocation. The Multi-core Processor system 100 includes an OS scheduler 104 configured to dispatch the tasks onto a core of the cores 102 based on the properties. The Multi-core Processor system 100 includes a load balancer 106 configured to maintain knowledge of the execution order and dependencies of the tasks 108. The load balance 106 is configured to dynamically control the core-affinity of various tasks in order to accomplish (e.g., process) the workload based on the execution order and/or dependencies of the tasks 108.

Upgrading legacy-software for use with a multi-core architecture involves analysis, re-design, and development of the software. In Long Term Evolution (LTE) and New Radio (NR) modem baseband software (BBS) and Protocol Stack (PS) development, each of the tasks is designed to handle procedures in either Non Access Stratum (NAS) layer, Radio Resource Control (RRC) layer, Packet Data Convergence Protocol (PDCP) layer, Radio Link Control (RLC) layer, Medium Access Control (MAC) layer or Physical layer processing. A single core implementation is not scalable for higher order Multiple Input Multiple Output (MIMO) with Carrier Aggregation (CA). The single core implementation involves stabilizing and calibrating the multi-core software architecture to achieve optimum or desired performance. The performance is defined in terms of total execution time and energy consumption, and it is a difficult, iterative and time-consuming effort to achieve optimality or improvement. Thus, it would be desirable to reduce the time-consuming task by supporting adoption of a multi-core architecture, without much effort from the BBS and PS software developer.

Thus, it is desired to address the above mentioned disadvantages or other shortcomings or at least provide a useful alternative.

SUMMARY

Some example embodiments provide a method for energy aware load balancing in a multi-core processor system for 5G and B5G network in real time.

Some example embodiments provide dividing each of a plurality of tasks into a plurality of task-jobs.

Some example embodiments provide scheduling each of the task-jobs on at least one core of the multi-core processor system based on at least one core configuration.

Some example embodiments provide assembling an output of the each of the task-jobs.

Some example embodiments provide obtaining profile data of at least one task.

Accordingly, some example embodiments provide a method for load balancing in a multi-core processor of an electronic device. The method includes dividing, by the electronic device, a first task and at least one second task into a plurality of task-jobs, determining, by the electronic device, at least one core configuration for each of the plurality of task-jobs, scheduling, by the electronic device, each of the plurality of task-jobs on at least one core of the multi-core processor based on the at least one core configuration to generate an execution schedule, and executing, by the multi-core processor, the plurality of task-jobs according to the execution schedule.

In some example embodiments, dividing the first task and the at least one second task into the plurality of task-jobs includes obtaining, by the electronic device, profile data of the first task and the at least one second task, the profile data including at least one of respective entry points of the first task and the at least one second task, respective exit points of the first task and the at least one second task, respective execution times of the first task and the at least one second task, respective pre-emption states of the first task and the at least one second task, an inter-task communication type between the first task and the at least one second task, an inter-task communication metric between the first task and the at least one second task or an interaction metric, and dividing, by the electronic device, the first task and the at least one second task into the plurality of task-jobs based on the profile data.

The dividing further includes analyzing an execution flow of the first task and the at least one second task, wherein the execution flow includes at least one of an execution time of the first task and the at least one second task, and/or an execution of foot print of the first task and the at least one second task. The dividing also includes analyzing the profile data of the first task and the at least one second task and dividing the first task and the at least one second task into a plurality of task-jobs based on the analysis of the profile data, and the analysis of the execution flow.

In some example embodiments, the method for load balancing further includes performing by the electronic device at least one of, assembling the plurality of task-jobs to form at least one new task based on profile data of the plurality of task-jobs, or assembling the first task and the at least one second task to form the at least one new task based on the profile data.

In some example embodiments, the profile data includes the interaction metric and the inter-task communication metric, the interaction metric is an interaction cost, and the inter-task communication metric is an inter-task communication cost between the first task and the at least one second task.

In some example embodiments, determining at least one core configuration for each of the plurality of task-jobs includes determining, by the electronic device, a level of utilization of each of a plurality of cores of the multi-core processor, determining, by the electronic device, a respective interaction metric between two or more task-jobs among the plurality of task-jobs and a respective communication metric between the two or more task-jobs, determining, by the electronic device, a total execution time of each of the plurality of task-jobs, and determining, by the electronic device, the at least one core configuration based on the level of utilization, the respective interaction metric, the respective communication metric, and the total execution time of each of the plurality of task-jobs.

In some example embodiments, wherein the at least one core configuration identifies the plurality of task-jobs and the at least one core of the multi-core processor on which the plurality of task-jobs are to be scheduled and executed.

In some example embodiments, the respective interaction metric is a respective interaction cost between the two or more task-jobs and the respective communication metric is a respective communication cost between the two or more task-jobs, and the determining the at least one core configuration includes, determining a respective task-job among the plurality of task-jobs having a highest dependency based on the respective interaction metric and the respective communication metric, and designating the respective task-job and task-jobs among the plurality of task-jobs on which the respective task-job depends to be executed on a single core among the plurality of cores.

Some example embodiments provide an electronic device including a multi-core environment for load balancing. The electronic device includes a multi-core processor configured to execute a plurality of task-jobs according to an execution schedule; and a processing circuitry configured to, divide a first task and at least one second task into the plurality of task-jobs, determine at least one core configuration for each of the plurality of task-jobs, and schedule each of the plurality of task-jobs on at least one core of the multi-core processor based on the at least one core configuration to generate the execution schedule.

These and other aspects of some example embodiments will be better appreciated and understood when considered in conjunction with the following description and the accompanying drawings. It should be understood, however, that the following descriptions, while indicating some example embodiments and numerous specific details thereof, are given by way of illustration and not of limitation. Many changes and modifications may be made within the scope of some example embodiments without departing from the spirit thereof, and some example embodiments include all such modifications.

BRIEF DESCRIPTION OF FIGURES

Some example embodiments are illustrated in the accompanying drawings, throughout which, like reference letters indicate corresponding parts in the various figures. Some example embodiments herein will be better understood from the following description with reference to the drawings, in which.

DETAILED DESCRIPTION

Figure 1:
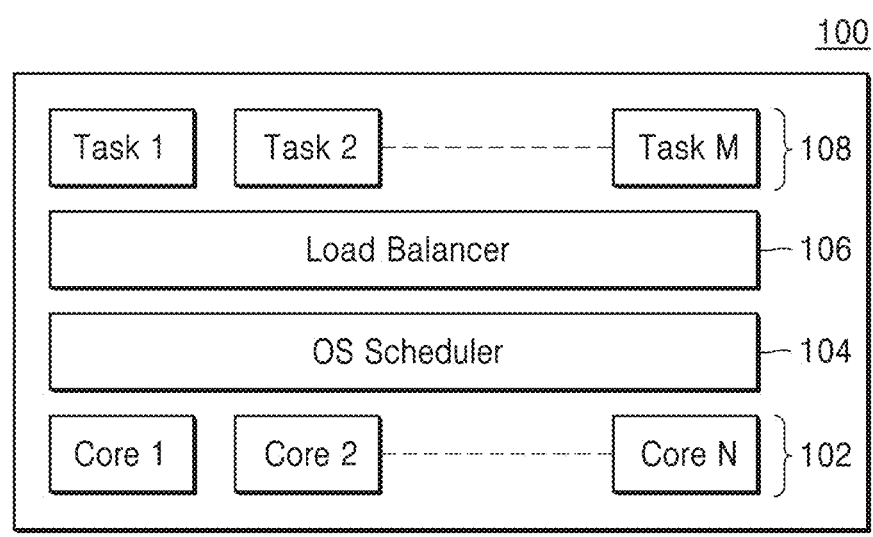
FIG. 1 is a block diagram of a conventional Multi-core Processor architecture with a load balancer and an OS scheduler.

Some example embodiments herein and the various features and advantageous details thereof are explained with reference to the non-limiting examples that are illustrated in the accompanying drawings and detailed in the following description. Descriptions of well-known components and processing techniques may be omitted so as to not unnecessarily obscure some example embodiments. Also, some example embodiments described herein are not necessarily mutually exclusive, as some example embodiments can be combined with one or more other example embodiments to form new embodiments. The term "or" as used herein, refers to a non-exclusive or, unless otherwise indicated. The examples used herein are intended merely to facilitate an understanding of ways in which some example embodiments herein can be practiced and to further enable those skilled in the art to practice some example embodiments. Accordingly, the examples should not be construed as limiting the scope of some example embodiments.

As is traditional in the field, some example embodiments may be described and illustrated in terms of blocks which carry out a described function or functions. These blocks, which may be referred to herein as managers, units, modules, hardware components or the like, may be physically implemented by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. According to some example embodiments, the blocks may be physically implemented by analog and/or digital circuits such as logic gates, integrated circuits, microprocessors, microcontrollers, memory circuits, passive electronic components, active electronic components, optical components, hardwired circuits and/or the like, and/or may optionally be driven by firmware and software. The circuits may, for example, be embodied in one or more semiconductor chips, and/or on substrate supports such as printed circuit boards and/or the like. The circuits constituting a block may be implemented by dedicated hardware, by a processor (e.g., one or more programmed microprocessors and associated circuitry), or by a combination of dedicated hardware to perform some functions of the block and a processor to perform other functions of the block. Each described and/or illustrated block may be physically separated into two or more inter-acting and discrete blocks without departing from the scope of the disclosure. Likewise, the described and/or illustrated blocks may be physically combined into more complex blocks without departing from the scope of the disclosure.

The accompanying drawings are used to help easily understand various technical features and it should be understood that some example embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, some example embodiments provide a method for load balancing in a multi-core processor system. The method includes dividing at least one task into a plurality of task-jobs. The method further includes determining at least one core configuration for each of the task-job. The method also includes scheduling each of the task-jobs on at least one core of the multi-core processor system based on the at least one core configuration. The method further includes assembling an output of the each of the task-jobs.

Unlike conventional methods, the proposed load balancer for an RTOS running on MP minimizes or reduces energy consumption while maintaining an even or balanced computational load on the multiple cores. According to some example embodiments, the load balancer is configured to ensure an optimal or desirable distribution of tasks on available cores in such a way that, the computational load is balanced among the cores and the energy consumption of the cores is minimized or low. The energy consumption of cores is proportionate to the total running time of the tasks. Thus, minimizing or reducing the total runtime of all the tasks leads to the minimization or reduction of energy consumption.

Referring now to the drawings, and more particularly to FIGS. 2-8, where similar reference characters denote corresponding features consistently throughout the figures, there are shown some example embodiments.

Figure 2:
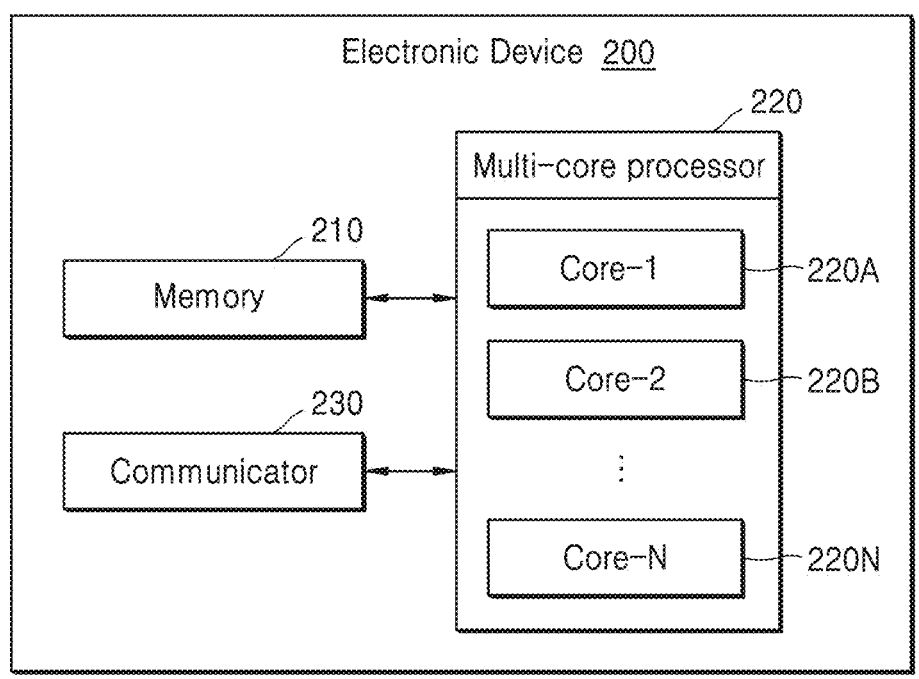
FIG. 2 is a block diagram of an electronic device for load balancing in a Multi-core Processor of the electronic device, according to some example embodiments.

FIG. 2 is a block diagram of an electronic device 200, according to some example embodiments. In some example embodiments, the electronic device 200 includes a memory 210, a multi-core processor 220 and/or a communicator 230. The multi-core processor 220 includes a plurality of cores (e.g., core-1 220A, core-2 220B, ... core-N 220N). The multi-core processor 220 is configured to execute instructions stored in the memory 210 and to perform various processes. The communicator 230 is configured for communicating internally between internal hardware components and/or with external devices via one or more networks.

The memory 210 may be configured to store instructions to be executed by the multi-core processor 220. The memory 210 may include non-volatile storage elements. Examples of such non-volatile storage elements may include magnetic hard discs, optical discs, floppy discs, flash memories, and/or forms of erasable programmable memories (EPROM) and/or electrically erasable and programmable read only memories (EEPROM). In addition, the memory 210 may, in some examples, be considered a non-transitory storage medium. The term "non-transitory" may indicate that the storage medium is not embodied in a carrier wave or a propagated signal. However, the term "non-transitory" should not be interpreted as implying that the memory 210 is non-movable. In some examples, the memory 210 may be configured to store larger amounts of information than the memory (e.g., over time the memory 210 may store an amount of data exceeding a capacity of the memory 210 by deleting previously stored data and storing new data). In certain examples, a non-transitory storage medium may store data that may, over time, change (e.g., in Random Access Memory (RAM) and/or cache).

In some example embodiments, electronic device 200 may include processing circuitry configured to perform energy aware load balancing in real time.

Although FIG. 2 shows various hardware components of the electronic device 200, it is to be understood that some example embodiments are not limited thereto. In some example embodiments, the electronic device 200 may include less or more components. Further, the labels or names of the components are used only for illustrative purposes and do not limit the scope of some example embodiments.

Figure 3:
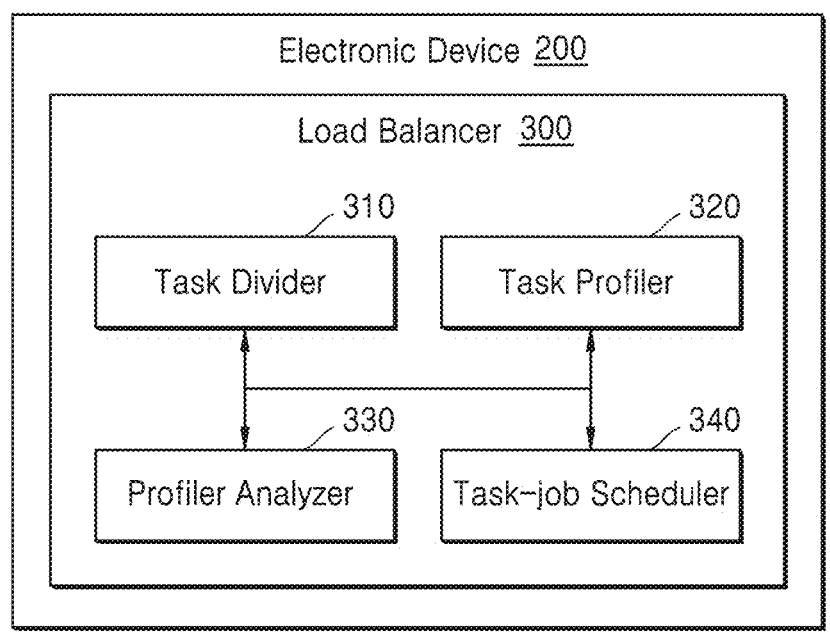
FIG. 3 is a block diagram of the Multi-core Processor for load balancing, according to some example embodiments.

FIG. 3 is a block diagram of a load balancer for balancing tasks. According to some example embodiments, the load balancer 300 may be included in the electronic device 200. According to some example embodiments, the load balancer 300 may be included in the multi-core processor 220. According to some example embodiments, the tasks may be software processes, threads, operations, etc. The load balancer 300 may be configured to balance the load on the multi-core processor 220 for efficient working. The load balancer 300 includes a task divider 310, a task profiler 320, a profiler analyzer 330 and/or a task-job scheduler 340. In some example embodiments, the multi-core processor 220 includes (e.g., receives and/or stores) a number of tasks for execution. The task divider 310 may divide the tasks into a plurality of task-jobs based on profile data of the tasks. According to some example embodiments, the task-jobs may be sub-processes of the tasks, such as, software loops, functions, mathematic calculations, etc. The profile data may be obtained by the task profiler 320. The profiler analyzer 330 may generate a graph illustrating (e.g., organizing) a plurality of task jobs based on the profile data. According to some example embodiments, operations described herein as being performed by the electronic device 200, the load balancer 300, the task divider 310, the task profiler 320, the profiler analyzer 330 and/or the task-job scheduler 340 may be performed by processing circuitry.

After generating the graph, the task-job scheduler 340 may schedule the tasks onto the plurality of cores (e.g., core-1 220A, core-2 220B, . . . core-N 220N) for efficient execution. In some example embodiments, the load balancer 300 may determine at least one core configuration for each of the task-jobs. In some example embodiments, the load balancer 300 may create a new dynamic task for each task-job where two or more task-jobs from the same parent task or a similar parent task are to be allocated on different cores. According to some example embodiments, the load balancer 300 may determine a level of utilization of each of the cores of the multi-core processor, determine an interaction metric (e.g., an interaction cost between a plurality of task-jobs) and a communication metric, (e.g., a communication cost between the plurality of task-jobs) determine a total execution time of each of the task-jobs, and determine at least one core configuration (e.g., at least one core on which the plurality of task-jobs are to be scheduled and executed) based on the level of utilization, the interaction metric, the communication metric, and the total execution time. According to some example embodiments, the load balancer 300 may determine a respective task-job among the plurality of task-jobs having the highest dependency based on the interaction metric and the communication metric, and determines the at least one core configuration such that the respective task-job having the highest dependency (e.g., the task-job having the highest number of other task-jobs on which it is dependent) and the task-jobs on which the respective task-job depends are designated (e.g., configured, assigned and/or scheduled) to be executed on the same core or a similar core.

Figure 4:
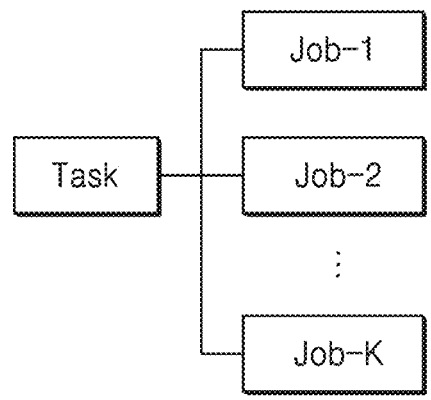
FIG. 4 is a schematic diagram illustrating a task job model, according to some example embodiments.

FIG. 4 is a schematic view of a task-job model. As seen in FIG. 4 a task may be divided into plurality of task jobs: Job-1, Job-2 . . . Job-K by the task divider 310. In some example embodiments, the profile data may be obtained for each task which is to be divided into plurality of task-jobs by the task profiler 320. The profile data to be obtained may include, an entry point of the task, an exit point of the task, an execution time of the task, a pre-emption state of the task, an inter-task communication type between the task an another task, an inter-task communication metric (e.g., an inter-task communication cost) of communication between the task and the other task, and/or an interaction metric (e.g., interaction cost between the task and the other task). The inter-task communication cost may correspond to the time used for the task and the other task to communicate between tasks. After obtaining the profile data, the profiler analyzer 330 may perform a profiler analysis on the obtained profile data. Based on the profiler analysis the task divider 310 may divide the tasks into plurality of task-jobs.

In some example embodiments, the profiler analyzer 330 may generate a direct acyclic graph (DAG) based on the profile data. The load balancer 300 may calculate a task-job metric based on the generated DAG. The task-jobs metric may include start time and/or communication time between the plurality of task-jobs. Based on the values in the DAG the load balancer 300 may calculate a task-job execution time and/or a inter task-job communication time for the plurality of task-jobs. The task-job execution time and/or the inter task-job communication time may be calculated by the load balancer 300 based on a start time of the current task-job, a time at which a communication between the current task-job and a next task-job is triggered, and/or a start time of the next task job (e.g., as provided in the DAG).

Figure 5:
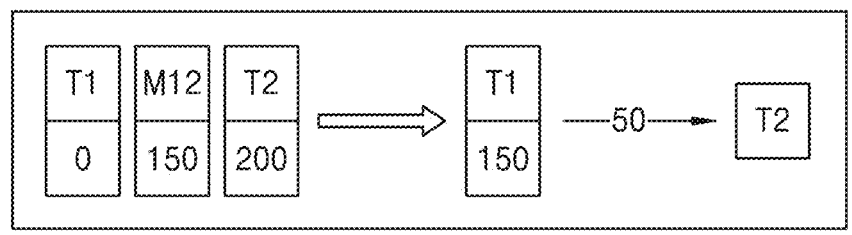
FIG. 5 is a schematic diagram, illustrating an example calculation of execution time of task-job, according to some example embodiments.

FIG. 5 is a schematic diagram, illustrating an example for calculating the execution time of task-job, according some example embodiments. As seen in FIG. 5, a task-job T1 started at time 't1=0' microseconds (us) and sent a message M12 to task-job T2 at time 't2=150' us. Then T2 started at time 't3=200' us. So, execution time for T1=(t2−t1)=150 us and inter-task-job communication time between T1 to T2 is (t3−t2)=50 us. Based on the execution time of the task-jobs and the inter task-jobs communication time, the task-job scheduler 340 may schedule the plurality of task-jobs to the one or more cores of the multi-core processor 220.

In some example embodiments, an epoch is defined for the generated DAG. The epoch is a pre-defined or defined single unit of time during which the load balancer 300 may operate.

Figure 6:
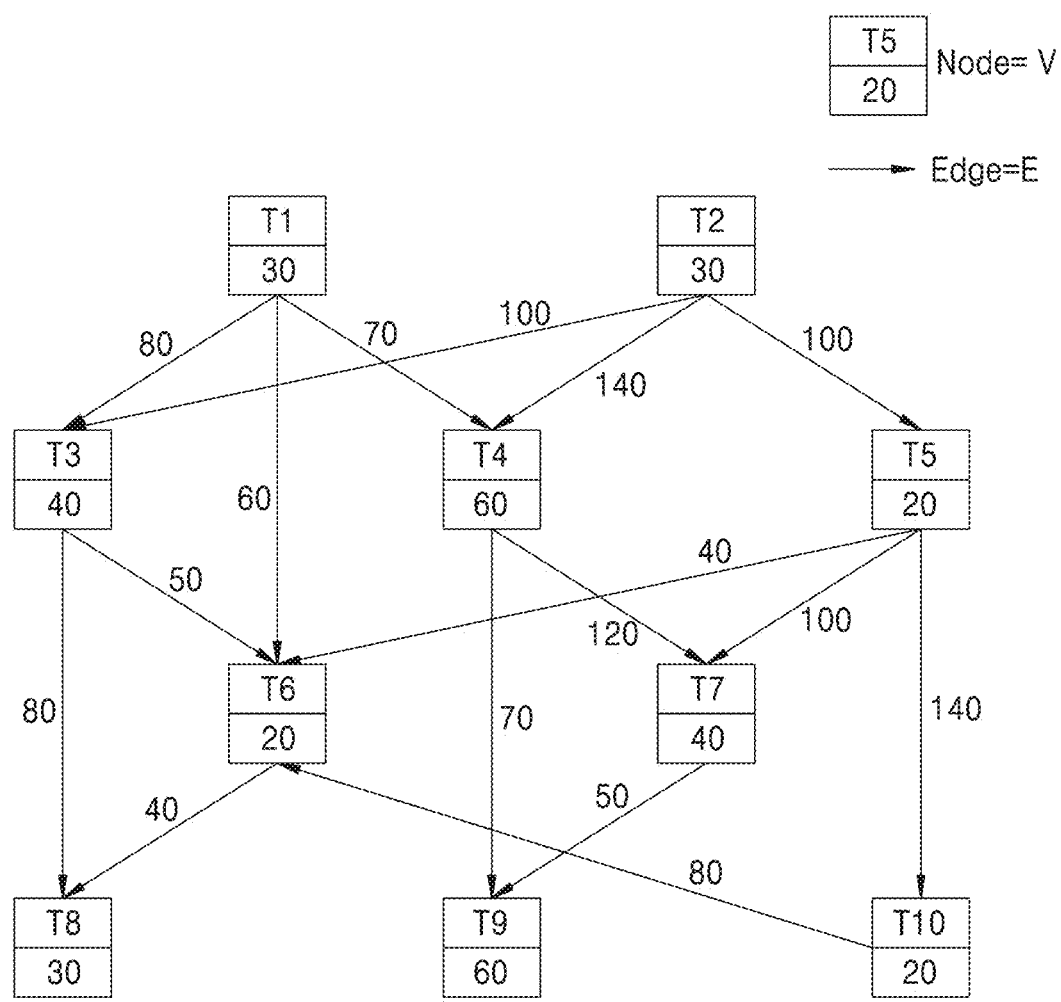
FIG. 6 is a directed acyclic graph (DAG) illustrating a runtime and communication cost for various task jobs, according to some example embodiments.

FIG. 6 shows the DAG illustrating calculation of runtime (e.g., execution time) and communication costs (e.g., inter task-job communication time) for various task jobs, according to some example embodiments. In FIG. 6, V is a set of nodes and E is a set of edges. At each node, $T_u$ denotes the task-job identity. The value under $T_u$ denotes the run-time of the task-job μ(u) of the corresponding task-job identity. The interaction metric or the communication cost between two task-jobs $T_u$ and $T_v$ is denoted by the edge γ(u, v). The directed edge means that the task-job $T_v$ may only begin after the task-job $T_u$ is finished and the data to be used by the task-job $T_v$ is ready (e.g., dependency). Further, the value on the edge γ(u, v) denotes the communication cost when $T_u$ and $T_v$ lie on (e.g., are executed by) different cores. When $T_u$ and $T_v$ lie on the same core or a similar core, the communication cost γ(u, v) scales down by a constant factor α depending on the underlying processor architecture where $0 \le \alpha \le 1$.

Further, if the communication cost between two task-jobs is sufficiently higher than the total execution time of the two task-jobs (e.g., a threshold amount higher), then the task-job scheduler 340 may not schedule the two task-jobs on different cores (e.g., for parallelization). The DAG may be split into as many groups (e.g., partitions) as the number of cores such that: all groups have the same or nearly the same execution time, and the communication cost between the groups is reduced to a minimum or a low cost.

The example DAG is shown in FIG. 6. The DAG includes, root nodes and sink nodes. Root nodes are the task-jobs which do not have any parents. For example, in FIG. 6, T1 and T2 are root nodes. Sink nodes are the task-jobs which have parents but no children. For example, in FIG. 6, T8, T9, and T10 are sink nodes. Further, the start-time of a task-job is the longest path from the root node to itself. Mathematically, let s(v) be the start time of $T_v$ and is provided by Equation (1).

$$s(v) = \max\{s(u) + \mu(u) + \gamma(u,v) | (u,v) \in E\} \quad \text{Equation (1)}$$

A d-value d(v) of a given task-job $T_v$ is the longest path from $T_v$ to a sink node in the current partition. A t-value t(v) of a given task-job $T_v$ is the total time it may take for a given task-job $T_v$ to complete execution, when it is part of the current partition. Mathematically, let t(v) be defined as given in Equation (2).

$$t(v) = s(v) + d(v) \quad \text{Equation (2)}$$

Initially, for each node $T_v$ in the graph, s(v), d(v) and t(v) are calculated (e.g., by the task-job scheduler 340). The task-job scheduler 340 group a task-job into a given cluster (e.g., group and/or partition) based on the t(v) for task-job. The task-job scheduler 340 may start by placing every sink node v into its own group (e.g., partition and/or cluster). Then, the task-job scheduler 340 may consider grouping every such node u, all of whose immediate children are have been already assigned to a group. Such a node is called a fresh task-job. For every fresh task-job u, d(u) may be computed as provided in Equation (3) in which v represents each immediate child task-job of the fresh task-job u.

$$d(u)=\max\{\mu(u)+\gamma(u,v)+d(v)\}$$ Equation (3)

The immediate child which defines d (u) is called the best child and may be used by the task-job scheduler 340 when grouping. In some example embodiments, two or more fresh task-jobs may have the same dominant child or a similar dominant child. After calculating the d-value d(u) for all of the fresh task-jobs, the corresponding t-values are calculated.

Figure 7:
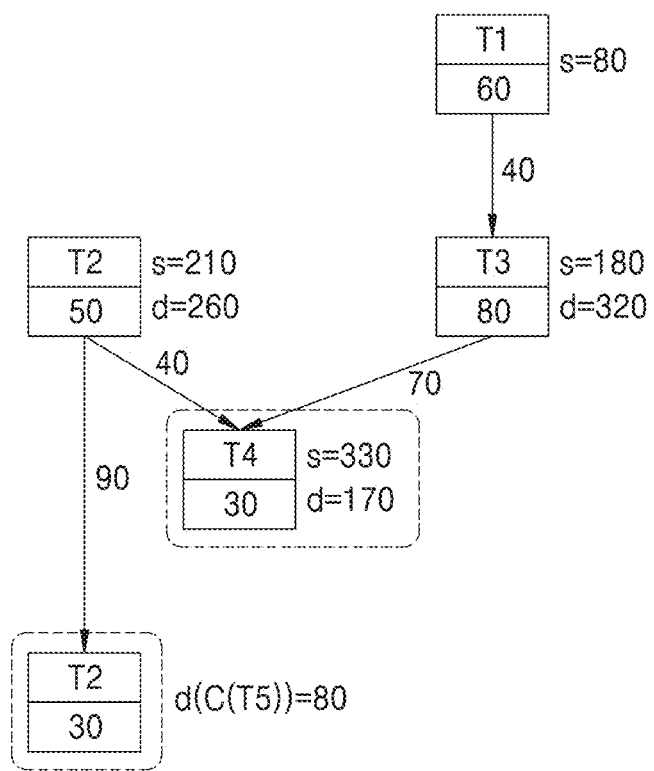
FIG. 7 is a DAG illustrating calculation of d-values of task jobs, according to some example embodiments.

FIG. 7 shows the schematic diagram illustrating the calculation of a d-value for a fresh task-job. In FIG. 7, T2 and T3 are fresh task-jobs, as all of their children have been already grouped. However, T1 is not a fresh task-job, because its child T3 is not grouped yet. The d-value of T2 may be calculated as max{μ(T2)+γ(T2, T4)+d(T4), μ(T2)+γ(T2, T5)+d(T5)}=max{50+40+170, 50+90+80}=260. Accordingly, for the fresh task-job T2, the immediate child task-job T5 is determined to be the best child. After calculating the t-values of all of the fresh task-jobs, the fresh task-jobs are arranged in decreasing order of their t-values.

For a fresh task-job u, with the maximum (e.g., highest) t(u), let v be the best child. Further, let v be part of a group $G_v$. The task-job scheduler 340 may assign the fresh task-job u to the group $G_v$, if the assignment would reduce either d(u) or d($G_v$) (referred to herein as condition (A)), but would not increase both, and the t-value of the combined group would not exceed a threshold value (e.g., the threshold value determined using Equation (4)). In Equation (4), N is the number of cores on the multi-core processor.

$$\text{Threshold} = \frac{\sum_u t(u)}{N}$$ Equation (4)

Figure 8:
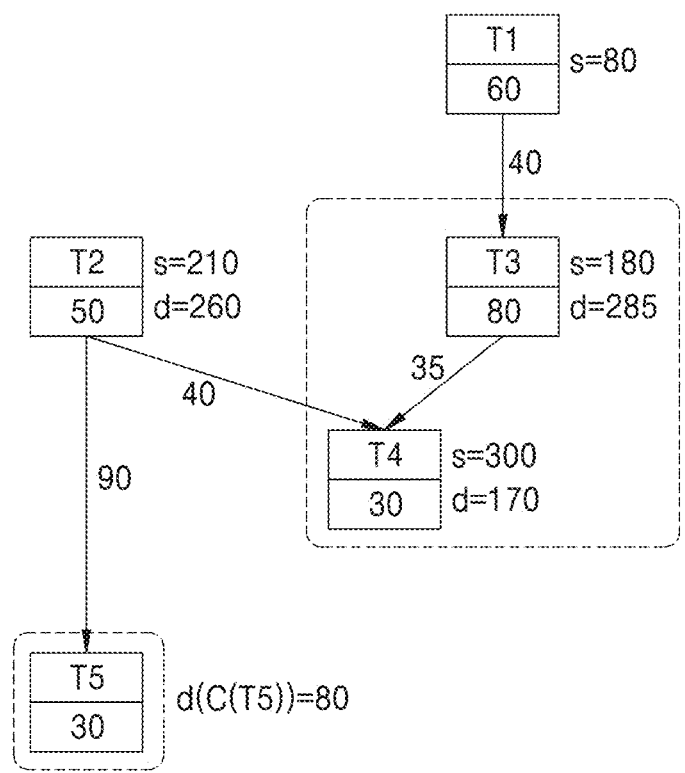
FIG. 8 is a DAG illustrating grouping of task jobs, according to some example embodiments.

If the above said two conditions, namely condition (A) and Equation (4), are not satisfied, the task-job scheduler 340 may assign the fresh task-job u to a group all by itself. When a fresh task-job joins a group, the communication cost between the fresh task-job and the group scales down by a factor α. Consider an example of grouping fresh task-jobs in which α=0.5. From FIG. 7, it is observed that if T3 is merged into the group of T4, d(T3) is reduced from 320 to 285. Further, d(T4) remains unchanged. However, s(T4) is reduced from 330 to 300. Similarly, T2 may not be merged into the group of T4 because the merger would increases d(T2). FIG. 8 shows the merged group.

The process of scheduling the task-jobs, merging groups, and processing the DAG as discussed above may be continued until all the nodes of the graph are processed. According to some example embodiments, once the fresh task-job is assigned to a group, a parent task-job of the recently assigned task-job may become a fresh task-job and the process may repeat with respect to the new fresh task-job. According to some example embodiments, the load balancer 300 (e.g., the profiler analyzer 330) may assemble two or more task-jobs to form at least one new task based on an analysis of the profile data of the two or more task-jobs.

In some example embodiments, the number of groups output by the proposed method may be greater than the number of cores. In such a scenario the groups may be merged. Consider a group G1 having minimum or lowest workload among all groups and a group G2 also having minimum or lowest workload, or second lowest workload, among all groups, then in such case the group G1 and G2 may be merged. Accordingly, some example embodiments provide a load balancer configured to partition software tasks configuring for a single-core processor into groups of sub-tasks for execution on a multi-core processor to provide an even or nearly even load across the cores of the multi-core processor. By providing an even or nearly-even load across the cores of the multi-core processor the load balancer reduces processing time of the multi-core processor while reducing energy consumption of the multi-core processor.

Some example embodiments disclosed herein may be implemented using processing circuitry. For example, some example embodiments disclosed herein may be implemented using at least one software program running on at least one hardware device and performing network management functions to control the elements.

The foregoing description of some example embodiments will so fully reveal the general nature thereof that others can, by applying current knowledge, readily modify and/or adapt for various applications some example embodiments without departing from the generic concept, and, therefore, such adaptations and modifications should and are intended to be comprehended within the meaning and range of equivalents of some example embodiments. It is to be understood that the phraseology or terminology employed herein is for the purpose of description and not of limitation. Therefore, while some example embodiments herein have been described in terms of examples, those skilled in the art will recognize that some example embodiments may be practiced with modification within the spirit and scope of some example embodiments as described herein.

We claim:

1. A method for load balancing in a multi-core processor of an electronic device, the method comprising:
    dividing, by the electronic device, a first task and at least one second task into a plurality of task-jobs;
    determining, by the electronic device, at least one core configuration for each of the plurality of task-jobs based on,
        a level of utilization of each of a plurality of cores of the multi-core processor,
        a respective interaction metric between two or more task-jobs among the plurality of task-jobs,
        a respective communication metric between the two or more task-jobs, and
        a total execution time of each of the plurality of task-jobs;
    scheduling, by the electronic device, each of the plurality of task-jobs on at least one core of the multi-core processor based on the at least one core configuration to generate an execution schedule; and
    executing, by the multi-core processor, the plurality of task-jobs according to the execution schedule.

2. The method as claimed in claim 1, wherein the dividing comprises:
    obtaining, by the electronic device, profile data of the first task and the at least one second task, the profile data including at least one of respective entry points of the first task and the at least one second task, respective exit points of the first task and the at least one second task, respective execution times of the first task and the at least one second task, respective pre-emption states of the first task and the at least one second task, an inter-task communication type between the first task and the at least one second task, an inter-task communication metric between the first task and the at least one second task, or an interaction metric between the first task and the at least one second task; and dividing, by the electronic device, the first task and the at least one second task into the plurality of task-jobs based on the profile data.

3. The method as claimed in claim 1, further comprises:
performing by the electronic device at least one of,
assembling the plurality of task-jobs to form at least one new task based on profile data of the plurality of task-jobs, or
assembling the first task and the at least one second task to form the at least one new task based on the profile data.

4. The method as claimed in claim 2, wherein the profile data includes the interaction metric and the inter-task communication metric, the interaction metric is an interaction cost, and the inter-task communication metric is an inter-task communication cost between the first task and the at least one second task.

5. The method as claimed in claim 1, wherein the determining at least one core configuration comprises:
determining, by the electronic device, the level of utilization;
determining, by the electronic device, the respective communication metric and the respective interaction metric; and
determining, by the electronic device, the total execution time of each of the plurality of task-jobs.

6. The method as claimed in claim 1, wherein the at least one core configuration identifies the plurality of task-jobs and the at least one core of the multi-core processor on which the plurality of task-jobs are to be scheduled and executed.

7. The method as claimed in claim 5, wherein
the respective interaction metric is a respective interaction cost between the two or more task-jobs and the respective communication metric is a respective communication cost between the two or more task-jobs; and
the determining the at least one core configuration includes,
determining a respective task-job among the plurality of task-jobs having a highest dependency based on the respective interaction metric and the respective communication metric, and
designating the respective task-job and task-jobs among the plurality of task-jobs on which the respective task-job depends to be executed on a single core among the plurality of cores.

8. An electronic device including a multi-core environment for load balancing, the electronic device comprising:
a multi-core processor configured to execute a plurality of task-jobs according to an execution schedule; and
a processing circuitry configured to,
divide a first task and at least one second task into the plurality of task-jobs,
determine at least one core configuration for each of the plurality of task-jobs based on,
a level of utilization of each of a plurality of cores of the multi-core processor,
a respective interaction metric between two or more task-jobs among the plurality of task-jobs,
a respective communication metric between the two or more task-jobs, and
a total execution time of each of the plurality of task-jobs, and
schedule each of the plurality of task-jobs on at least one core of the multi-core processor based on the at least one core configuration to generate the execution schedule.

9. The electronic device as claimed in claim 8, wherein the processing circuitry is configured to divide the first task and the at least one second task into a plurality of task-jobs by:
obtaining profile data of the first task and the at least one second task, the profile data including at least one of respective entry points of the first task and the at least one second task, respective exit points of the first task and the at least one second task, respective execution times of the first task and the at least one second task, respective pre-emption states of the first task and the at least one second task, an inter-task communication type between the first task and the at least one second task, an inter-task communication metric between the first task and the at least one second task, or an interaction metric between the first task and the at least one second task; and
dividing the first task and the at least one second task into the plurality of task-jobs based on the profile data.

10. The electronic device as claimed in claim 8, wherein the processing circuitry is configured to perform at least one of:
assembling the plurality of task-jobs to form at least one new task based on profile data of the plurality of task-jobs; or
assembling a plurality of tasks to form the at least one new task based on profiler data of the plurality of tasks.

11. The electronic device as claimed in claim 9, wherein the profile data includes the interaction metric and the inter-task communication metric, the interaction metric is an interaction cost, and the inter-task communication metric is an inter-task communication cost between the first task and the at least one second task.

12. The electronic device as claimed in claim 8, wherein the processing circuitry is configured to determine at least one core configuration for each of the plurality of task-jobs by:
determining the level of utilization;
determining the respective communication metric and the respective interaction metric; and
determining the total execution time of each of the plurality of task-jobs.

13. The electronic device as claimed in claim 8, wherein the at least one core configuration identifies the plurality of task-jobs and the at least one core of the multi-core processor on which the plurality of task-jobs are to be scheduled and executed.

14. The electronic device, of claim 12, wherein
the respective interaction metric is a respective interaction cost between of the two or more task-jobs and the respective communication metric is a respective communication cost between the two or more task-jobs; and
the determining the at least one core configuration includes,
determining a respective task-job among the plurality of task-jobs having a highest dependency based on the respective interaction metric and the respective communication metric, and designating the respective task-job and task-jobs among the plurality of task-jobs on which the respective task-job depends to be executed on a single core among the plurality of cores.

15. A method for load balancing in a multi-core processor of an electronic device, the method comprising:
    dividing, by the electronic device, a first task and at least one second task into a plurality of task-jobs;
    determining, by the electronic device, at least one core configuration for each of the plurality of task-jobs;
    scheduling, by the electronic device, each of the plurality of task-jobs on at least one core of the multi-core processor based on the at least one core configuration to generate an execution schedule; and
    executing, by the multi-core processor, the plurality of task-jobs according to the execution schedule,
    wherein the method further comprises performing, by the electronic device, at least one of,
        assembling the plurality of task-jobs to form at least one new task based on profile data of the plurality of task-jobs, or
        assembling the first task and the at least one second task to form the at least one new task based on the profile data of the plurality of task-jobs.

16. The method as claimed in claim 15, wherein the dividing comprises:
    obtaining, by the electronic device, profile data of the first task and the at least one second task, the profile data of the first task and the at least one second task including at least one of respective entry points of the first task and the at least one second task, respective exit points of the first task and the at least one second task, respective execution times of the first task and the at least one second task, respective pre-emption states of the first task and the at least one second task, an inter-task communication type between the first task and the at least one second task, an inter-task communication metric between the first task and the at least one second task or an interaction metric; and
    dividing, by the electronic device, the first task and the at least one second task into the plurality of task-jobs based on the profile data of the first task and the at least one second task.

17. The method as claimed in claim 16, wherein the profile data of the first task and the at least one second task includes the interaction metric and the inter-task communication metric, the interaction metric is an interaction cost, and the inter-task communication metric is an inter-task communication cost between the first task and the at least one second task.

18. The method as claimed in claim 15, wherein the determining at least one core configuration comprises:
    determining, by the electronic device, a level of utilization of each of a plurality of cores of the multi-core processor;
    determining, by the electronic device, a respective interaction metric between two or more task-jobs among the plurality of task-jobs and a respective communication metric between the two or more task-jobs;
    determining, by the electronic device, a total execution time of each of the plurality of task-jobs; and
    determining, by the electronic device, the at least one core configuration based on the level of utilization, the respective interaction metric, the respective communication metric, and the total execution time of each of the plurality of task-jobs.

19. The method as claimed in claim 15, wherein the at least one core configuration identifies the plurality of task-jobs and the at least one core of the multi-core processor on which the plurality of task-jobs are to be scheduled and executed.

20. The method as claimed in claim 18, wherein
    the respective interaction metric is a respective interaction cost between the two or more task-jobs and the respective communication metric is a respective communication cost between the two or more task-jobs; and
    the determining the at least one core configuration includes,
        determining a respective task-job among the plurality of task-jobs having a highest dependency based on the respective interaction metric and the respective communication metric, and
        designating the respective task-job and task-jobs among the plurality of task-jobs on which the respective task-job depends to be executed on a single core among the plurality of cores.

* * * * *